(12) United States Patent
McGoun

(10) Patent No.: US 6,267,227 B1
(45) Date of Patent: Jul. 31, 2001

(54) CONVEYORS FOR PARTICULATE MATERIAL

(75) Inventor: Peter McGoun, Newbury (GB)

(73) Assignee: Entecon Limited, Surrey (GB)

( * ) Notice: Subject to any disclaimer, the term of this patent is extended or adjusted under 35 U.S.C. 154(b) by 0 days.

(21) Appl. No.: 09/424,845

(22) PCT Filed: May 28, 1998

(86) PCT No.: PCT/GB98/01561

§ 371 Date: Mar. 7, 2000

§ 102(e) Date: Mar. 7, 2000

(87) PCT Pub. No.: WO98/56695

PCT Pub. Date: Dec. 17, 1998

(30) Foreign Application Priority Data

Jun. 11, 1997 (GB) .................................................. 9712067

(51) Int. Cl.$^7$ .................................................. B65G 19/14
(52) U.S. Cl. .................. 198/716; 198/359; 198/360; 198/370.01; 198/735.3; 198/860.4
(58) Field of Search ................................. 198/716, 360, 198/359, 370.01, 735.3, 860.4

(56) References Cited

U.S. PATENT DOCUMENTS

| | | | |
|---|---|---|---|
| 2,147,199 | * | 2/1939 | Hapman ................................. 198/716 |
| 3,001,633 | | 9/1961 | Heitshu . |
| 3,223,228 | * | 12/1965 | Ferris et al. ........................... 198/360 |
| 3,256,862 | * | 6/1966 | Patterson ................................ 198/360 |
| 3,279,592 | * | 10/1966 | Kerkvliet ................................ 198/360 |
| 3,575,306 | * | 4/1971 | Obermeyer ............................. 198/671 |
| 3,586,155 | | 6/1971 | Heitshu . |
| 5,147,029 | * | 9/1992 | Wadell ................................... 198/716 |
| 5,174,320 | | 12/1992 | Allen . |
| 5,267,672 | * | 12/1993 | Jacobsen et al. ....................... 198/716 |
| 5,526,920 | | 6/1996 | Ellsworth . |

FOREIGN PATENT DOCUMENTS

| | | |
|---|---|---|
| 725 140 | 7/1942 | (DE) . |
| 2940253 | 4/1981 | (DE) . |
| 397 271 | 11/1990 | (EP) . |
| 743394 | 1/1956 | (GB) . |

* cited by examiner

Primary Examiner—Christopher P. Ellis
Assistant Examiner—Khoi H. Tran
(74) Attorney, Agent, or Firm—Bacon & Thomas, PLLC

(57) ABSTRACT

A tubular slow speed drag or aero mechanical conveyor assembly (1) for transporting particulate material, includes a tubular valve (11) positioned in line with conveyor tubes (1) of the assembly and rotatable relative thereto. The valve (11) has at least one elongate aperture (21) through which particulate material can leave the assembly (1) and means (24,25) are provided for sequentially rotating the tubular valve (11) between positions in which the at least one aperture (21) is in the open or closed position of the valve (11). In one arrangement the rotation imparting means comprises an air cylinder (23) operable to impart linear movement to a gear rack (24) which meshes with and imparts rotational movement to an annular gear wheel (25) carried by the tubular valve (11).

10 Claims, 6 Drawing Sheets

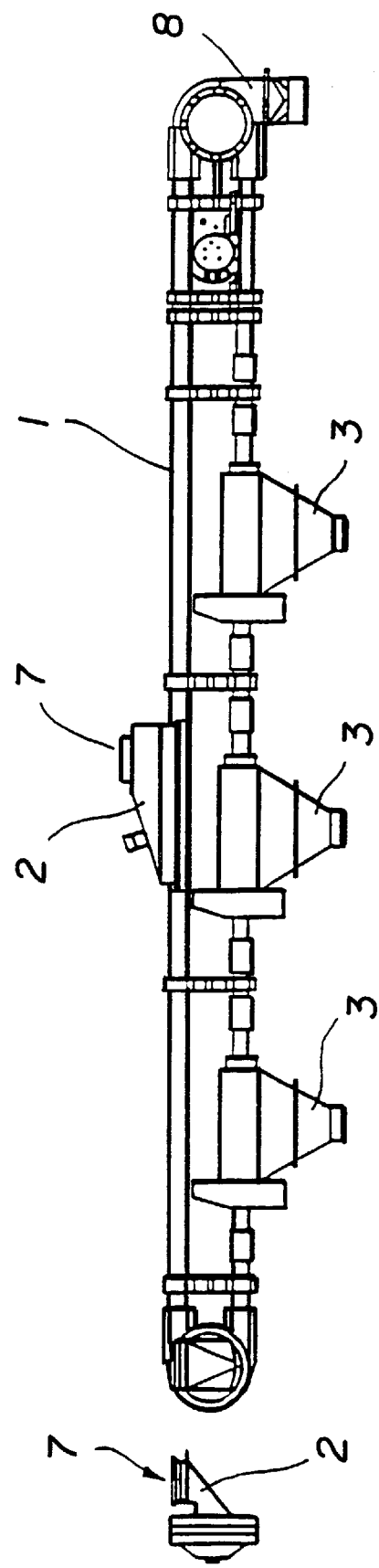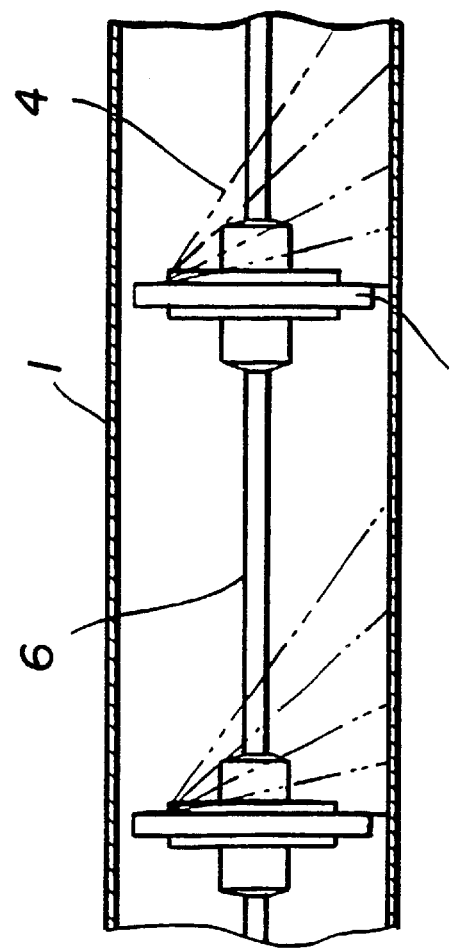

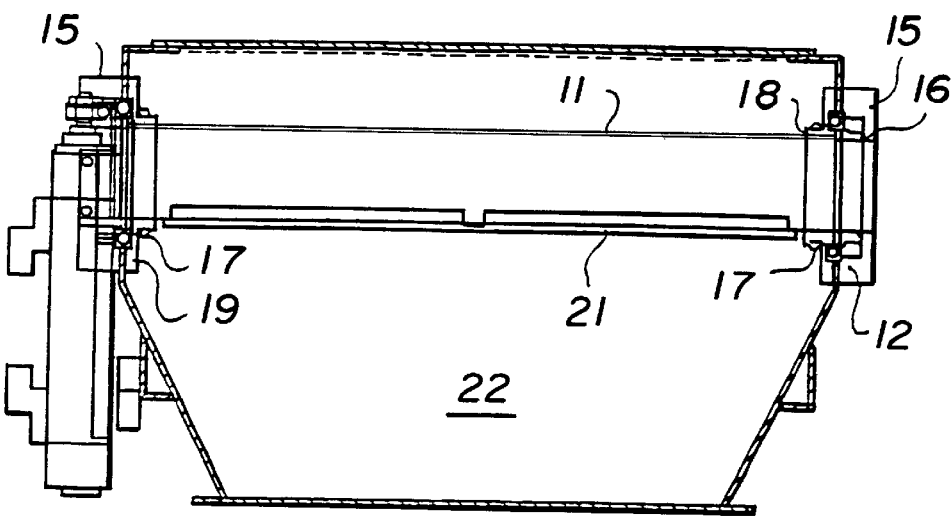
FIG. 3
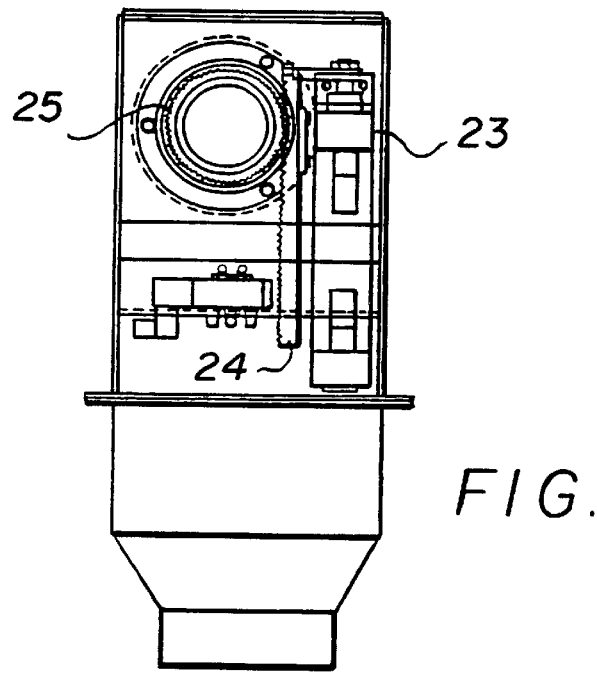
FIG. 4
FIG. 5
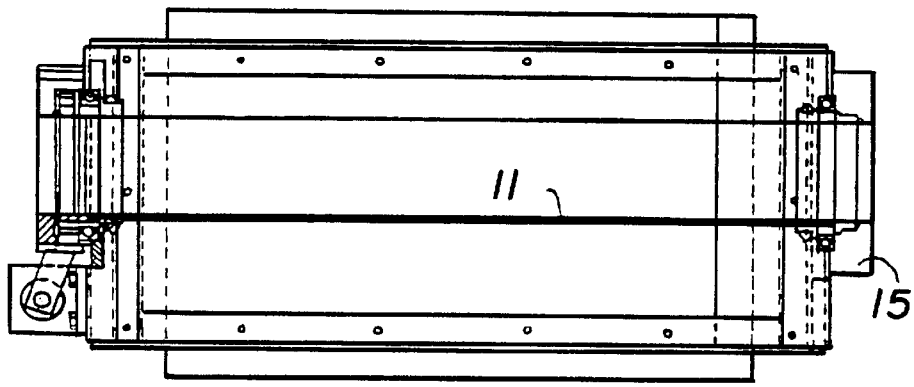

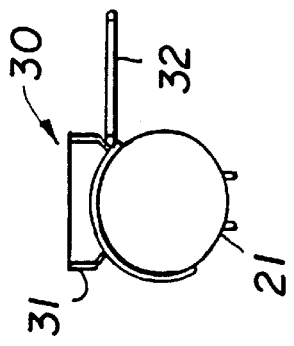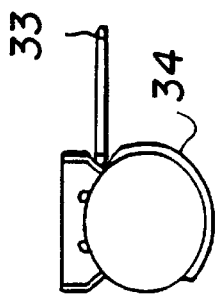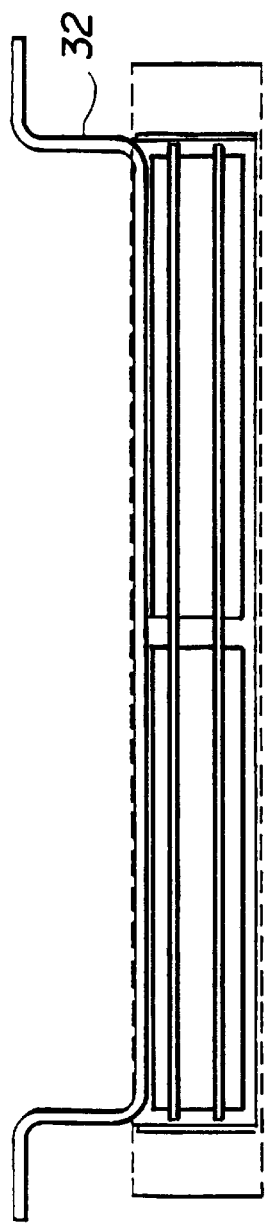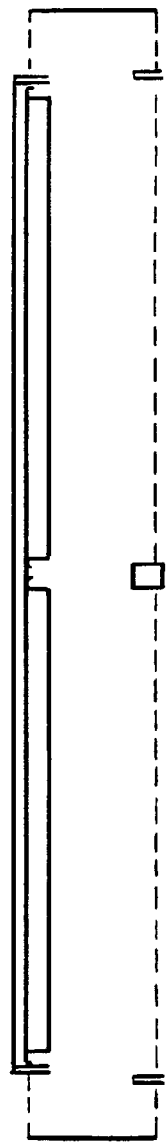

CONVEYORS FOR PARTICULATE MATERIAL

BACKGROUND OF THE INVENTION

1. Field of the Invention

This invention relates to conveyors for particulate material and more especially to relatively slow speed drag conveyors and aero mechanical conveyors.

2. Related Art

Slow speed drag conveyors and aero mechanical conveyors are of tubular construction and include a tensioned wire rope or chain to which are fitted a plurality of spaced plastics discs running between terminal sprockets. These conveyors operate at relatively slow speeds and effectively drag particulate material along the conveying tubes to a selected outlet valve. Throughputs of the order of between 8 and 32 $m^3$ per hour are typical. The tubes of the conveyor may be aligned horizontally, vertically or may be inclined.

Products commonly handled by such conveyors include tea, sugar, detergents, flour, seeds, granules, gypsum, polymer powders and resins and the conveyors are used extensively in the food, pharmaceutical and chemical industries.

The presence of the wire rope discs or chain discs within the tubes places severe constraints on the position and operation of outlet valves. It is possible to use butterfly and slide valves as outlet valves; generally, however, they are unacceptable and have severe design disadvantages.

Rotatable valves have also been proposed in the past, but have been relatively expensive and susceptible to damage because of particulate material becoming trapped between abutting and stationary members of the valve and conveyor tubes. A rotatable valve for metering the flow of a stream of pneumatically conveyed dry particulate material such as cement is disclosed in U.S. Pat. No. 5,174,320.

U.S. Pat. No. 3,586,155 discloses a tubular conveyor assembly with spool-shaped conveyor flights. These are pulled through a tube by an endless cable driven by a sprocket wheel. Material leaves the assembly through a rotatable valve.

It is an object of this invention to provide an improved rotatable valve for tubular conveyors which does not suffer from or at least alleviates many disadvantages of existing valves.

BRIEF SUMMARY OF THE INVENTION

According to the present invention in one aspect there is provided a tubular conveyor assembly comprising a plurality of conveyor tubes through which one or more members are drawn to transport particulate material therethrough, the assembly including a tubular valve positioned with its longitudinal axis generally in line with the direction of flow of material through the valve, and means for imparting rotation to the valve relative to neighbouring conveyor tubes, at least one elongate aperture formed in the tubular valve through which particulate material can leave the assembly and means for sequentially rotating the tubular valve about its longitudinal axis between positions in which the at least one aperture is in the open or closed position of the valve, the conveyor being characterised in that the rotation imparting means comprises an air cylinder operable to impart linear movement to a gear rack which meshes with and imparts rotational movement to an annular gear wheel carried by the tubular valve.

A seal is preferably positioned between rotating and stationary members of the assembly to prevent the ingress of particulate material therebetween. This seal may comprise an "O" ring seal.

DESCRIPTION OF THE DRAWINGS

The invention will now be described by way of example only with reference to the accompanying diagrammatic drawings in which:

FIG. 1 is an orthographic view of a conveyor in accordance with the invention;

FIG. 2 is a side view in section to an enlarged view showing the interior of a tube of the conveyor of FIG. 1 while in use;

FIG. 3 is a side elevational view of a rotatable valve of a conveyor in accordance with the invention;

FIGS. 4 and 5 are respectively end and plan views of the valve illustrated in FIG. 3;

FIGS. 10 and 11 are side and end views of a rotatable valve in accordance with the invention including an alternative closure member with the valve in its open position;

FIGS. 12 and 13 are side and end views of the rotatable valve illustrated in FIGS. 10 and 11 with the valve in its closed position;

DETAILED DESCRIPTION

Figure 7:
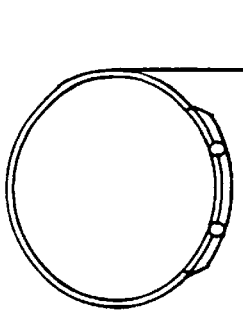
FIGS. 6 and 7 are side and end views of a rotatable valve in accordance with this invention including a valve closure member with the valve in its open position.
Figure 9:
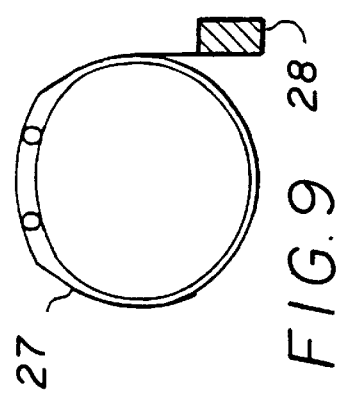
FIGS. 8 and 9 are side and end views of the rotatable valve illustrated in FIGS. 4 and 5 when in its closed position.
Figure 6:
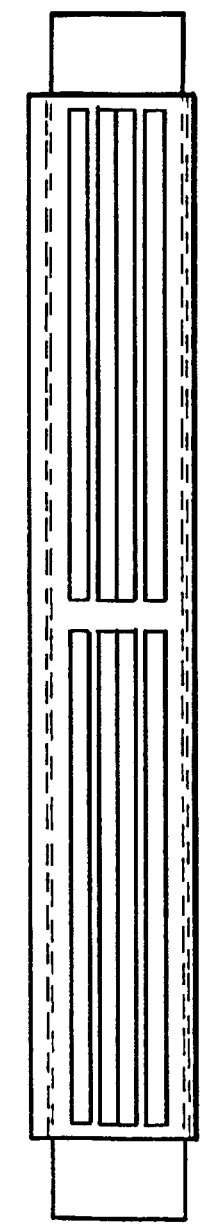
Figure 8:
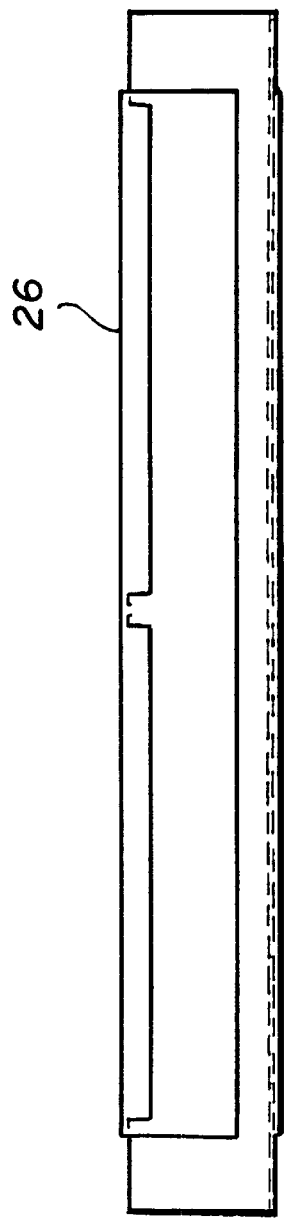

The conveyor illustrated in FIGS. 1 and 2 comprises a plurality of tubes 1 connected in line together to define a continuous path for particulate material to be conveyed from loading stations 2 to one of several discharge stations 3. Three discharge stations are shown; more or less such stations may however be present. Particulate matter 4 is conveyed through the tubes 1 by discs 5 carried by a wire rope 6 which is drawn through the tubes at slow speed by a motor. Movement of the discs through the tubes drags the particulate material and provides typical throughputs of up to 32 $m^3$/hr.

The conveyor illustrated is simply exemplary of such conveyors. The tubes may be aligned horizontally as shown or alternatively may be aligned vertically or inclined depending on the particular requirements of the end user.

Particulate material is admitted to the conveyor at either of loading stations 2 through entry ports 7 and is discharged at one of the stations 3 through a rotatable valve.

A rotatable valve in accordance with the invention is shown in greater detail in FIGS. 3 to 5.

The illustrated valve comprises a tube 11 positioned in line with neighbouring tubes of the conveyor. Each valve tube 11 is supported for rotation relative to the conveyor tubes 1 between bearings 12. Flanges of neighbouring conveyor tubes 1 are secured to stationary housings 15 of the bearings. Sealing rings 16 are positioned between each end of each valve tube 11 and the adjacent face of the respective housing 15 to prevent the ingress of particulate material. Annular Vee seals 17 are positioned between an end sleeve 18 of each valve tube 11 and a respective stationary sealing plate 19.

Each tubular valve 11 is formed with at least one lengthwise extending opening 21 through which, in use, particulate material is discharged from the conveyor and into an outlet 22 positioned immediately below the respective valve. The outlet 22 may then be connected directly to a receiving vessel or alternative storage member.

The tubular valve 11 is rotatable through 180° by an air cylinder 23. This is illustrated in FIG. 4. The cylinder 23 is connected to impart linear movement to a gear rack 24 whose teeth mesh with complementary teeth of an annular gear wheel 25 carried on one end of the valve tube 11. Thus, linear movement of the gear rack 23 imparts rotational movement to the valve tube 11 through the gear wheel 25. Each air cylinder precisely rotates the respective valve tube sequentially through 180° degrees to locate the opening 21 accurately either on the underside of the valve tube (the fully open position of the valve) or on the upperside of the valve tube (the fully closed position of the valve).

Operation of a selected air cylinder may be triggered by level sensors located in receiving vessels below the outlets 22. Alternatively, operation may be triggered by production programmes or pursuant to visual inspections.

As mentioned, when particulate material is to be discharged from one of the rotatable valves, the respective air cylinder 23 is operated to impart rotation through 180° to the selected rotatable valve tube 11 to move its opening 21 from its closed position in the roof of the valve tube to its open position in the floor of the valve tube. When sufficient material has been discharged the air cylinder is again operated to impart rotation in the opposite direction through 180° to return the valve to its closed position.

The air cylinder and linear gear offer a relatively inexpensive way of opening and closing each rotatable valve. Also the construction described above including the sealing ring provides an effective way of preventing ingress of particulate material between rotating and stationary members of each rotatable valve. It will be appreciated that such deposition of material will in time hinder effective operation of valves without the presence of a sealing ring or the like.

Applicants have found that when the rotatable valves are in their closed positions, in some instances material will tend to leave the conveyor through the openings 21 which are at that time sited in the roof of the valve tube. This in time can lead to operating problems.

In the arrangement illustrated in FIGS. 6 to 9, when the rotatable valve is in its open position (see FIGS. 6 and 7) the material is free to flow from the valve tube 11 but that when the rotatable valve is in its closed position (see FIGS. 8 and 9) material is prevented from leaving through the opening 21 by a closure member 26.

The closure member shown in these Figures comprises a flexible sheet 27 of, e.g. soft rubber which spans and overlaps the opening 21 and is tensioned by a weight 28. With the valve in its open position the sheet 27 simply hangs from its attachment to the valve tube 11 and is spaced from the opening 21. However, when the valve tube 11 is rotated through 180° to prevent further discharge of material, the sheet is progressively wrapped about the valve tube until it overlies the opening 21 thereby preventing the outflow of material. The valve is now in the position shown in FIGS. 8 and 9. Further rotation of the valve tube through 180° returns the assembly to the position shown in FIGS. 6 and 7.

An alternative closure member 30 is illustrated in FIGS. 10 to 13. In this arrangement a pivotable hood 31 is positioned above the valve tube 11 and includes an arm 32 mounted for rotation about a pivot 33. A lifting cam 34 is carried by the tubular valve 11, the end of the arm 32 remote from the pivot 33 lying in contact with the surface of the cam 34.

As will be seen from these Figures, as the valve tube 11 is rotated between its open and closed positions, so the hood 31 is moved by the cam to a position in which the hood edges sealingly engage the bordering surfaces of the opening 21 of the valve tube. This prevents any discharge of material through the opening when the rotatable valve is in its closed position.

Figure 16:
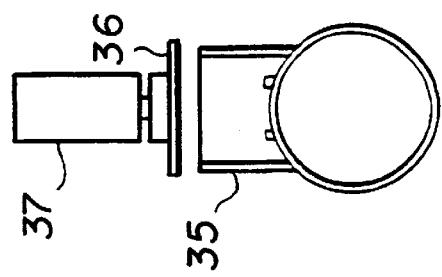
FIGS. 14, 15 and 16 are plan, side and end views respectively of a rotatable valve in accordance with the invention including a second alternative closure member when the valve in its open position.
Figure 14:
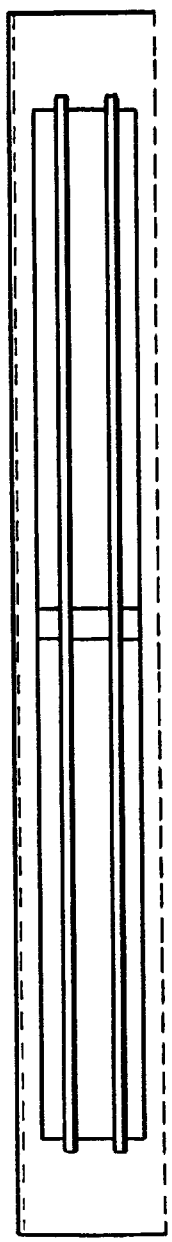
Figure 15:
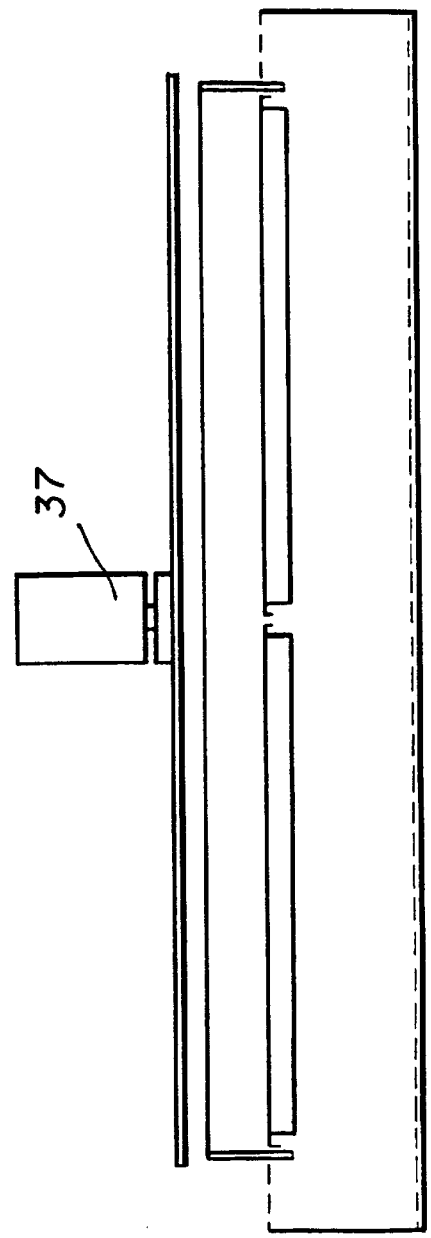

A further closure member is illustrated in FIGS. 14 to 16. In this arrangement an open topped hood 35 is positioned above the tubular valve 11 and can selectively be opened and closed by a sealing lid 36 connected to a lifting device.

Figure 18:
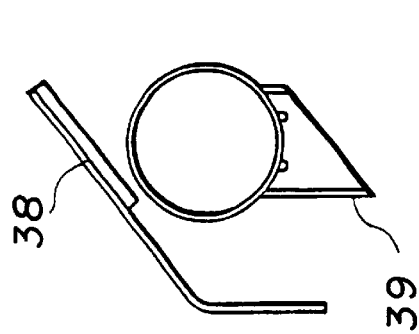
FIGS. 17 and 18 are plan and end views respectively of a rotatable valve in accordance with the invention including a third alternative closure member when the valve is in its open position.
Figure 20:
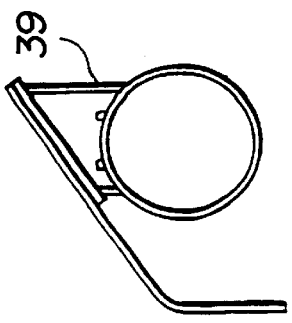
FIGS. 19 and 20 are plan and side views respectively of the valve shown in FIGS. 17 and 18 in its closed position.
Figure 17:
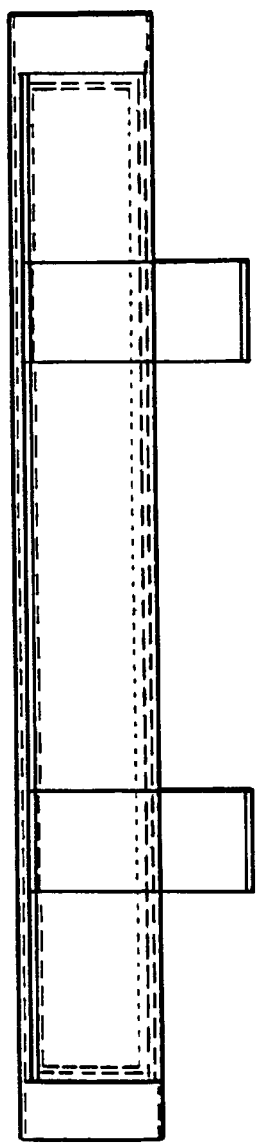
Figure 19:
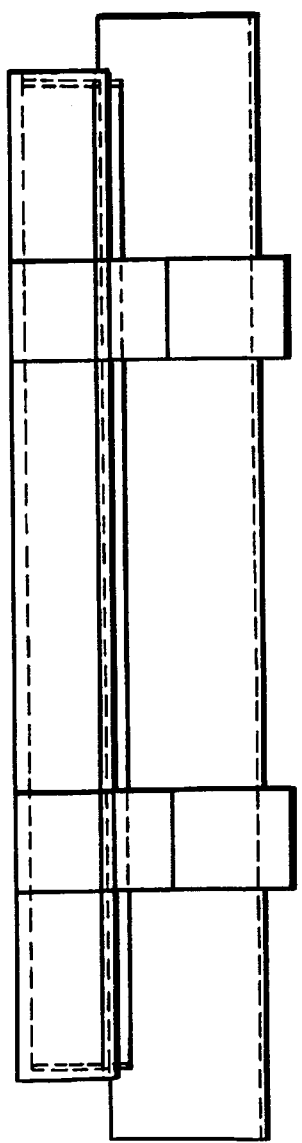

A further alternative closure member is illustrated in FIGS. 17 to 20. In this arrangement an open top slanted hood 39 is positioned above the tubular valve 11. In the closed position of the valve shown in FIGS. 19 and 20, the tubular valve 11 presses against a fixed sealing plate 38. When the valve is in its open position as shown in FIGS. 17 and 18 the hood 39 rotates away from the sealing plate 38.

It will be appreciated that the foregoing is merely exemplary of apparatus in accordance with the invention and that modifications can readily be made thereto without departing from the true scope of the invention.

What is claimed is:

1. A tubular conveyor assembly comprising a plurality of conveyor tubes (1) through which one or more members (5) are drawn to transport particulate material therethrough, the assembly including a tubular valve (11) positioned with its longitudinal axis generally in line with the direction of flow of material through the valve, and a rotation imparting device for imparting rotation (23) to the valve relative to neighbouring conveyor tubes, at least one elongate aperture (21) formed in the tubular valve through which particulate material can leave the assembly and said rotation imparting device including a driving device arranged for sequentially rotating the tubular valve about its longitudinal axis between positions in which the at least one aperture is in the open or closed position of the valve, said driving device comprising an air cylinder (23) operable to impart linear movement to a gear rack (24) which meshes with and imparts rotational movement to an annular gear wheel (25) carried by the tubular valve.

2. An assembly as claimed in claim 1 wherein a seal (16) is positioned between rotating and stationary members of the assembly to prevent the ingress of particulate material therebetween.

3. An assembly as claimed in claim 2 in which the seal is an "O" ring seal.

4. An assembly as claimed in claim 1 wherein the tubular valve is supported for rotation relative to the conveyor tubes between bearings (12).

5. An assembly as claimed in claim 4 wherein neighbouring conveyor tubes of the tubular valve include flanges which are secured to stationery housings (15) of the bearings.

6. An assembly as claimed in claim 5 wherein sealing rings (17) are positioned between each end of the tubular valve and the adjacent face of the respective housing.

7. An assembly as claimed in claim 1 wherein the tubular valve (11) is rotatable through 180° by the air cylinder (23).

8. An assembly as claimed in claim 1 further comprising a closure member (26) for the aperture (21) of the tubular valve (11).

9. An assembly as claimed in claim 8 wherein the closure member comprises a flexible sheet (27) which, in the closed position of the valve, overlaps the opening and is tensioned by a weight.

10. An assembly as claimed in claim 8 wherein the closure member comprises a pivotable hood (31).

\* \* \* \* \*